(12) United States Patent
Birsan et al.

(10) Patent No.: US 11,615,424 B2
(45) Date of Patent: Mar. 28, 2023

(54) SYSTEMS AND METHODS FOR DYNAMICALLY CONDUCTING MESSAGING CAMPAIGNS RESPONSIVE TO CUSTOMER EVENTS

(71) Applicant: SHOPIFY INC., Ottawa (CA)

(72) Inventors: Diana Rebeca Birsan, Ottawa (CA); Philibert Dugas, Terrebonne (CA); Carmen Spitz, Montreal (CA)

(73) Assignee: SHOPIFY INC., Ottawa (CA)

( * ) Notice: Subject to any disclaimer, the term of this patent is extended or adjusted under 35 U.S.C. 154(b) by 0 days.

(21) Appl. No.: 17/382,079

(22) Filed: Jul. 21, 2021

(65) Prior Publication Data

US 2023/0022851 A1    Jan. 26, 2023

(51) Int. Cl.
*G06Q 10/00* (2023.01)
*G06Q 30/016* (2023.01)
*G06F 16/2458* (2019.01)
*G06Q 10/0631* (2023.01)
*G06Q 30/0201* (2023.01)

(52) U.S. Cl.
CPC ....... *G06Q 30/016* (2013.01); *G06F 16/2474* (2019.01); *G06Q 10/06312* (2013.01); *G06Q 30/0201* (2013.01)

(58) Field of Classification Search
None
See application file for complete search history.

(56) References Cited

U.S. PATENT DOCUMENTS

| 8,660,877 B2* | 2/2014 | Mitchell | G06Q 10/06311 705/7.17 |
| 2002/0099593 A1* | 7/2002 | Kraft | G06Q 10/06315 705/7.16 |
| 2002/0138319 A1* | 9/2002 | Kaburagi | G07G 1/00 705/7.29 |
| 2002/0156601 A1* | 10/2002 | Tu | G06Q 10/10 702/188 |
| 2007/0179829 A1* | 8/2007 | Laperi | G06Q 10/063116 705/7.22 |

(Continued)

OTHER PUBLICATIONS

Carroll, Chris, Increasing Meeting Show Rates—Connecting with Customers Before Scheduled Appointments, Oct. 30, 2019, Engageware, https://engageware.com/blog/increasing-meeting-show-rates-with-customers/, p. 1 -8. (Year: 2019).*

*Primary Examiner* — Joseph M Waesco
(74) *Attorney, Agent, or Firm* — Ridout & Maybee LLP

(57) ABSTRACT

Methods and systems are disclosed for dynamically conducting messaging campaigns, responsive to customer events. A set of parameters for a messaging campaign includes an initial schedule for providing a set of messages from a set of data objects. Responsive to a customer event associated with a first customer, an adjusted schedule is generated for providing the set of messages to the first customer. The adjusted schedule differs from the initial schedule in a timing for providing at least a first message, where the first message is scheduled to be provided at an adjusted timing proportionate to a time period between the customer event and a first milestone event. The first message is generated from a first data object and transmitted to the first customer, in accordance with the adjusted schedule.

16 Claims, 7 Drawing Sheets

(56) References Cited

U.S. PATENT DOCUMENTS

| | | | |
|---|---|---|---|
| 2007/0299714 A1* | 12/2007 | Levine | G06Q 10/06 |
| | | | 705/7.14 |
| 2018/0300788 A1* | 10/2018 | Mattingly | G06Q 30/0625 |
| 2020/0210938 A1* | 7/2020 | Monovich | G06Q 10/06311 |
| 2021/0103944 A1* | 4/2021 | Hawkins | G06Q 30/0271 |
| 2022/0245574 A1* | 8/2022 | Celia | G06F 9/451 |
| 2022/0254335 A1* | 8/2022 | Itoh | G10L 15/16 |
| 2022/0276948 A1* | 9/2022 | McCunn | G06F 8/38 |

* cited by examiner

FIG. 2

SYSTEMS AND METHODS FOR DYNAMICALLY CONDUCTING MESSAGING CAMPAIGNS RESPONSIVE TO CUSTOMER EVENTS

FIELD

The present disclosure relates to systems and methods for dynamically conducting messaging campaigns in which the timing for generation and transmittal of messages from data objects associated with the messaging campaign is adjusted in response to detection of a customer event.

BACKGROUND

A merchant who is planning a product launch (e.g., planning to sell a new product in the future) may make the product available for preorder by customers. A preorder is an order (or a purchase) that a customer makes for a product prior to the product launch.

A merchant who plans to make a product available for preorder may also plan a set of messages (also referred to as a preorder messaging campaign) to be electronically generated from respective data objects and sent to customers who made preorders. The preorder messaging campaign is typically intended to promote customer engagement and incentivize referrals. Messages in the preorder messaging campaign are typically scheduled to be generated and sent to customers according to a fixed schedule that is based around an expected timeline of milestone events.

However, conventional preorder messaging campaigns have limited flexibility. For example, a preorder messaging campaign that was planned months in advance of the product launch may not be flexible enough to achieve the desired customer engagement.

SUMMARY

In various examples, the present disclosure describes systems and methods for dynamically conducting a messaging campaign, in particular a preorder messaging campaign. The generation and transmissions of messages to a given customer is dynamically scheduled in response to a customer event associated with that given customer.

The disclosed systems and methods address the problem of inflexibility found with conventional preorder messaging campaigns. In a conventional preorder messaging campaign, messages are typically scheduled based on a fixed number of days relative to the date a preorder is made (e.g., a welcome message is sent three days after the preorder is made) and/or a fixed number of days relative to a milestone date (e.g., a message is sent 1 week before the start of manufacturing to inform the customer that manufacturing is about to start).

A problem with conventional preorder messaging campaigns arises when preorders are made by customers at different times that do not fit into the schedule defined for the preorder messaging campaign. For example, if a preorder is made one day before the start of manufacturing, it would be irrelevant and a waste of computing resources (e.g., computing power and memory resources at a messaging platform to generate and transmit a message; and computing power and memory resources at the customer device to receive and display a message) to send a message informing that manufacturing is about to start and then the next day to send another message informing that manufacturing has started. Not only would this be a waste of computing resources, this may also cause customer annoyance and may cause the messages to be manually (e.g., by the customer) or automatically (e.g., by the receiving email server) flagged as spam.

In examples according to the present disclosure, a customer event (e.g., completion of a preorder sale) associated with a given customer is detected via an online network. Responsive to detection of the customer event, an adjusted schedule for providing messages to the given customer is generated. The adjusted schedule enables messages to be provided to the given customer with adjusted timing based on the detected customer event. For example, if the given customer makes a preorder after a first milestone event has passed, an initially scheduled message related to the first milestone event may be omitted from the adjusted schedule. In another example, if the date on which a preorder is made means that, according to the schedule, two messages would be sent in close temporal proximity, the present disclosure enables a single combined message to be sent instead. Thus, the present disclosure may reduce the number of messages that would otherwise need to be generated and transmitted to the customer. This provides technical improvements in that computing resources are used more efficiently at both the messaging platform and at the customer device.

In some examples, the present disclosure describes a system including a processing unit configured to execute instructions to cause the system to: receive a set of parameters for a messaging campaign, the set of parameters including a set of data objects each containing respective message content, the set of parameters also including an initial schedule for providing a set of messages from the set of data objects, wherein the initial schedule includes one or more milestone events defined in the set of parameters; responsive to a customer event associated with a first customer, generate an adjusted schedule for providing the set of messages to the first customer, wherein the adjusted schedule differs from the initial schedule in a timing for providing at least a first message, wherein in the adjusted schedule the first message is scheduled to be provided at an adjusted timing proportionate to a time period between the customer event and a first milestone event; generate at least the first message of the set of messages, from a respective first data object in the set of data objects, in accordance with the adjusted schedule; and responsive to generation of at least the first message, transmit at least the generated first message to the first customer.

In any of the preceding examples, the processing unit may be further configured to execute instructions to cause the system to generate the adjusted schedule by: determining a temporal relationship between the first message and a second message, based on the initial schedule or the message content in respective first and second data objects from which the first and the second messages are generated; and generating the adjusted schedule to maintain the temporal relationship between the first message and the second message in the adjusted schedule.

In any of the preceding examples, the processing unit may be further configured to execute instructions to cause the system to generate the adjusted schedule by: responsive to the customer event, identifying a second milestone event that is out-of-date relative to the customer event; determining a particular data object associated with the second milestone event; and generating the adjusted schedule to omit generation of any message from the particular data object.

In any of the preceding examples, the processing unit may be further configured to execute instructions to cause the system to generate the adjusted schedule by: responsive to the customer event, determining that the adjusted schedule causes at least two messages from respective at least two data objects to be scheduled in close temporal proximity; generating a new combined data object containing combined message content, the combined message content corresponding to a combination of the message content of the respective at least two data objects; and generating the adjusted schedule to provide a single message from the new combined data object to replace the at least two messages.

In any of the preceding examples, the processing unit may be further configured to execute instructions to cause the system to: responsive to determining that a timing of a third milestone event is shifted compared to the initial schedule, determine at least a second message scheduled by the initial schedule to be provided prior to occurrence of the third milestone; and further adjust the adjusted schedule to adjust timing for providing the second message proportionate to the shifted timing of the third milestone.

In any of the preceding examples, the processing unit may be further configured to execute instructions to cause the system to: prior to determining the shifted timing of the third milestone, generate and transmit at least the first message in accordance with the adjusted schedule, wherein one or more remaining messages, including the second message, are scheduled to be provided prior to occurrence of the third milestone in accordance with the adjusted schedule; and subsequent to determining the shifted timing of the third milestone, generate and transmit the one or more remaining messages, including the second message, in accordance with the further adjusted schedule.

In any of the preceding examples, the third milestone event may be defined as reaching a threshold number of customers. The processing unit may be further configured to execute instructions to cause the system to: query a database tracking the number of customers, to extract a historical trend; and determine, based on the historical trend, the shifted timing of the third milestone event.

In any of the preceding examples, the third milestone event may be defined as reaching a manufacturing threshold. The processing unit may be further configured to execute instructions to cause the system to: query a database tracking a manufacturing status, to extract a historical trend; and determine, based on the historical trend, the shifted timing of the third milestone event.

In some example aspects, the present disclosure describes a method, including: receiving a set of parameters for a messaging campaign, the set of parameters including a set of data objects each containing respective message content, the set of parameters also including an initial schedule for providing a set of messages from the set of data objects, wherein the initial schedule includes one or more milestone events defined in the set of parameters; responsive to a customer event associated with a first customer, generating an adjusted schedule for providing the set of messages to the first customer, wherein the adjusted schedule differs from the initial schedule in a timing for providing at least a first message, wherein in the adjusted schedule the first message is scheduled to be provided at an adjusted timing proportionate to a time period between the customer event and a first milestone event; generating at least the first message of the set of messages, from a respective first data object in the set of data objects, in accordance with the adjusted schedule; and responsive to generation of at least the first message, transmitting at least the generated first message to the first customer.

In any of the preceding examples, generating the adjusted schedule may include: determining a temporal relationship between the first message and a second message, based on the initial schedule or the message content in respective first and second data objects from which the first and the second messages are generated; and generating the adjusted schedule to maintain the temporal relationship between the first message and the second message in the adjusted schedule.

In any of the preceding examples, generating the adjusted schedule may include: responsive to the customer event, identifying a second milestone event that is out-of-date relative to the customer event; determining a particular data object associated with the second milestone event; and generating the adjusted schedule to omit generation of any message from the particular data object.

In any of the preceding examples, generating the adjusted schedule may include: responsive to the customer event, determining that the adjusted schedule causes at least two messages from respective at least two data objects to be scheduled in close temporal proximity; generating a new combined data object containing combined message content, the combined message content corresponding to a combination of the message content of the respective at least two data objects; and generating the adjusted schedule to provide a single message from the new combined data object to replace the at least two messages.

In any of the preceding examples, the method may include: responsive to determining that a timing of a third milestone event is shifted compared to the initial schedule, determining at least a second message scheduled by the initial schedule to be provided prior to occurrence of the third milestone; and further adjusting the adjusted schedule to adjust timing for providing the second message proportionate to the shifted timing of the third milestone.

In any of the preceding examples, the method may include: prior to determining the shifted timing of the third milestone, generating and transmitting at least the first message in accordance with the adjusted schedule, wherein one or more remaining messages, including the second message, are scheduled to be provided prior to occurrence of the third milestone in accordance with the adjusted schedule; and subsequent to determining the shifted timing of the third milestone, generating and transmitting the one or more remaining messages, including the second message, in accordance with the further adjusted schedule.

In any of the preceding examples, the third milestone event may be defined as reaching a threshold number of customers. The method may include: querying a database tracking the number of customers, to extract a historical trend; and determining, based on the historical trend, the shifted timing of the third milestone event.

In any of the preceding examples, the third milestone event may be defined as reaching a manufacturing threshold. The method may include: querying a database tracking a manufacturing status, to extract a historical trend; and determining, based on the historical trend, the shifted timing of the third milestone event.

In some example aspects, the present disclosure describes a computer readable medium having instructions encoded thereon. The instructions, when executed by a computing system, cause the computing system to: receive a set of parameters for a messaging campaign, the set of parameters including a set of data objects each containing respective message content, the set of parameters also including an initial schedule for providing a set of messages from the set of data objects, wherein the initial schedule includes one or more milestone events defined in the set of parameters; responsive to a customer event associated with a first customer, generate an adjusted schedule for providing the set of messages to the first customer, wherein the adjusted schedule differs from the initial schedule in a timing for providing at least a first message, wherein in the adjusted schedule the first message is scheduled to be provided at an adjusted timing proportionate to a time period between the customer event and a first milestone event; generate at least the first message of the set of messages, from a respective first data object in the set of data objects, in accordance with the adjusted schedule; and responsive to generation of at least the first message, transmit at least the generated first message to the first customer.

In any of the preceding examples, the computer readable medium may include instructions to cause the system to perform any of the methods described above.

BRIEF DESCRIPTION OF THE DRAWINGS

Reference will now be made, by way of example, to the accompanying drawings which show example embodiments of the present application, and in which:

FIG. 2 is an example homepage of an administrator, which may be accessed via the e-commerce platform of FIG. 1;

Similar reference numerals may have been used in different figures to denote similar components.

DESCRIPTION OF EXAMPLE EMBODIMENTS

Examples of the present disclosure are described in the context of an e-commerce platform. However, it should be understood that the e-commerce platform described herein is only one possible example and is not intended to be limiting. It should be understood that the present disclosure may be implemented in other contexts, and is not necessarily limited to implementation in an e-commerce platform.

The present disclosure describes example methods and systems for dynamically conducting a preorder messaging campaign. Messages transmitted as part of a preorder messaging campaign may be any form of electronic communication, including emails, text messages and social media messages, among other possibilities.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 1:
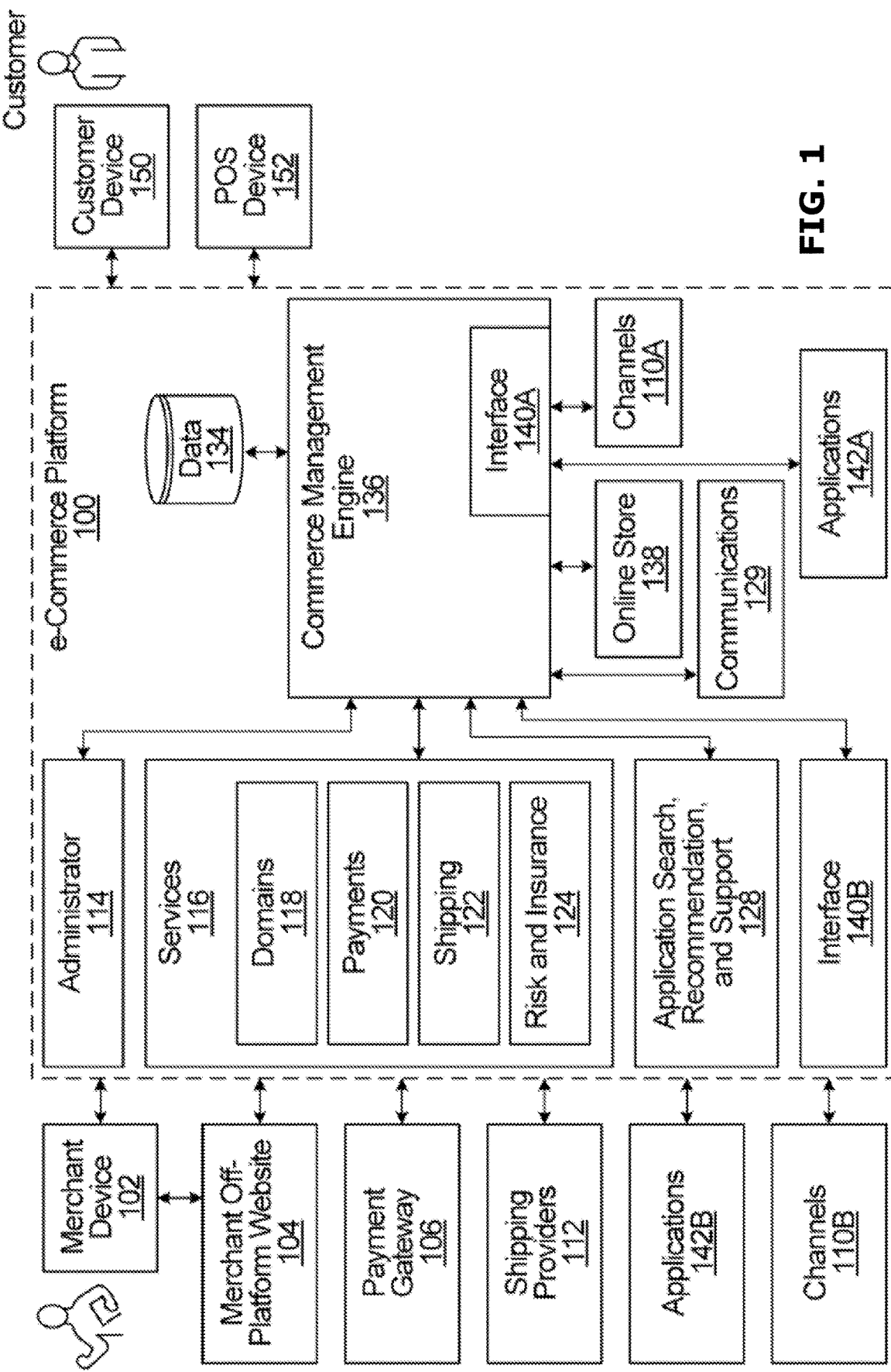
FIG. 1 is a block diagram of an example e-commerce platform, in which examples described herein may be implemented.

FIG. 1 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 2:
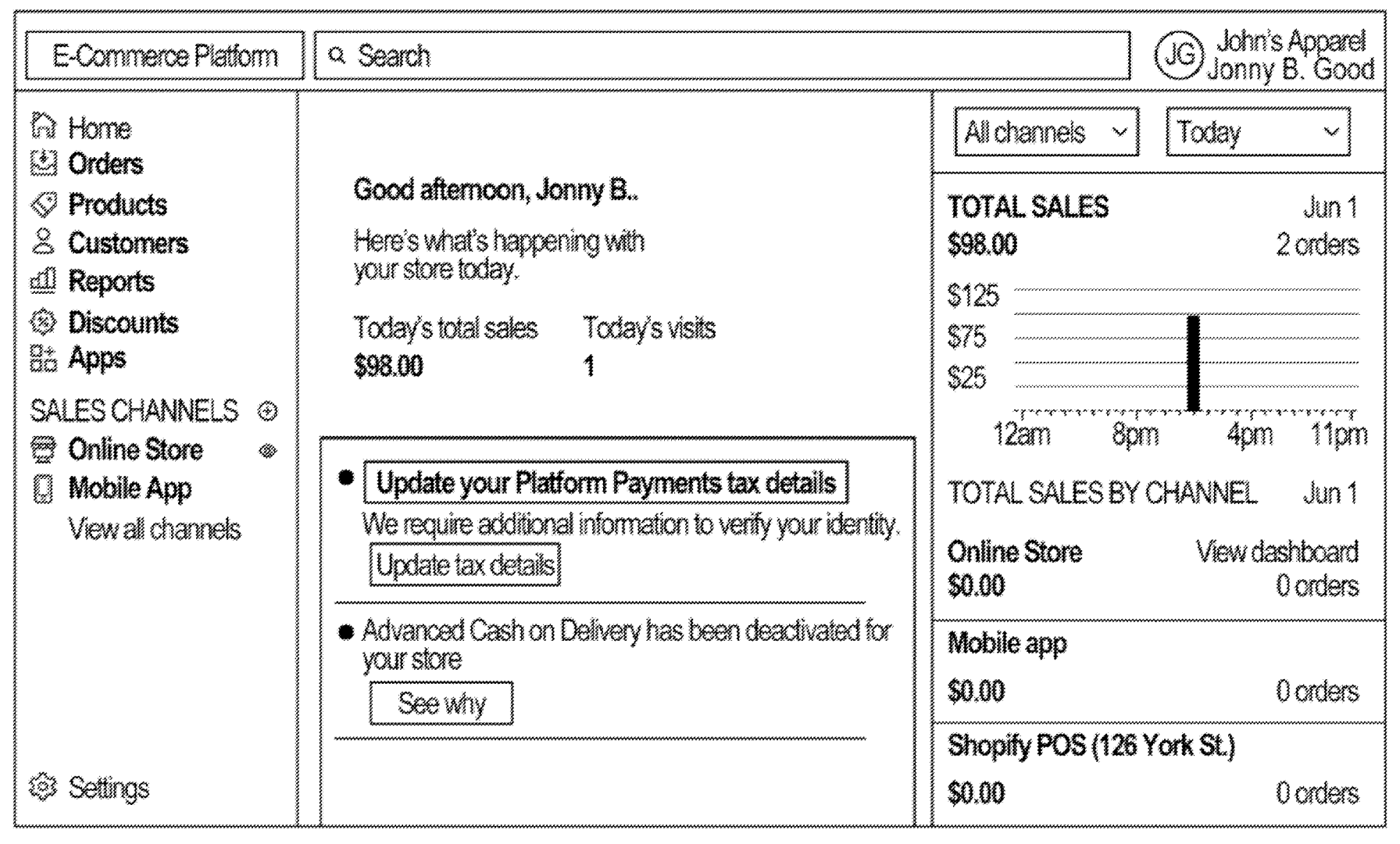

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing)

from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

In some examples, the online shopping operations provided by the e-commerce platform 100 described above may support preorder sales. The operations for processing a preorder sale may be similar to the operations for processing an order as described above (e.g., displaying a preorder product page as part of the online store 138, using a shopping cart object to track a customer's selection of a product to preorder, using a checkout object to receive customer information to complete the preorder, using the financial facility to complete payment of the preorder, etc.) however the preorder may not be fulfilled at the time the preorder is made because the produce has not yet been launched (e.g., not yet manufactured, not yet arrived into the country, etc.). The communications facility 129 may be used to provide electronic communications related to the preorder, to the customer device 150.

In particular, the communications facility 129 may be used to provide electronic communications as part of a preorder messaging campaign. The e-commerce platform 100 may include, may manage, or may have access to one or more messaging servers (e.g., email server) to provide messages to one or more preorder customers. As will be discussed further below, the e-commerce platform 100 may include a messaging campaign engine that manages and performs operations for carrying out a preorder messaging campaign. In particular, the messaging campaign engine implements a number of logic rules that enables dynamic adjustment of the schedule for providing messages for each customer. This addresses the problem that conventional preorder messaging campaigns are not flexible enough to consider how to adjust the messaging for each individual customer and/or for shifts in the expected timing of milestone events.

Implementation in an e-Commerce Platform

Figure 3A:
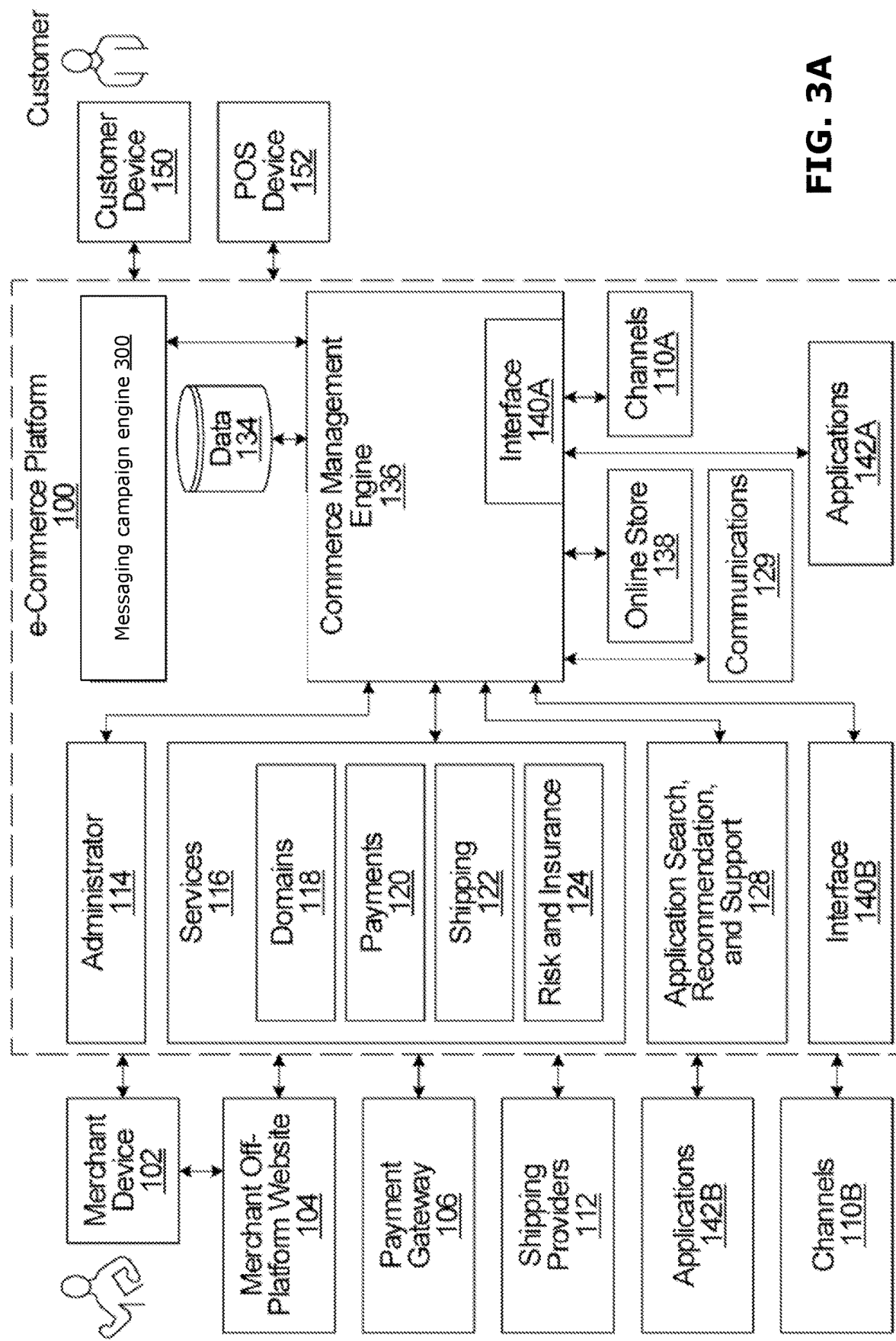
FIG. 3A is another block diagram of an example e-commerce platform, including a messaging campaign engine, in which examples described herein may be implemented.

The functionality described herein may be used in commerce to provide improved customer or buyer experiences. The e-commerce platform 100 could implement the functionality for any of a variety of different applications, examples of which are described elsewhere herein. FIG. 3A illustrates the e-commerce platform 100 of FIG. 1 but including a messaging campaign engine 300. The messaging campaign engine 300 is an example of a computer-implemented system that implements the functionality described herein. Further details of the messaging campaign engine 300 are shown in FIG. 3B and discussed further below.

Figure 3B:
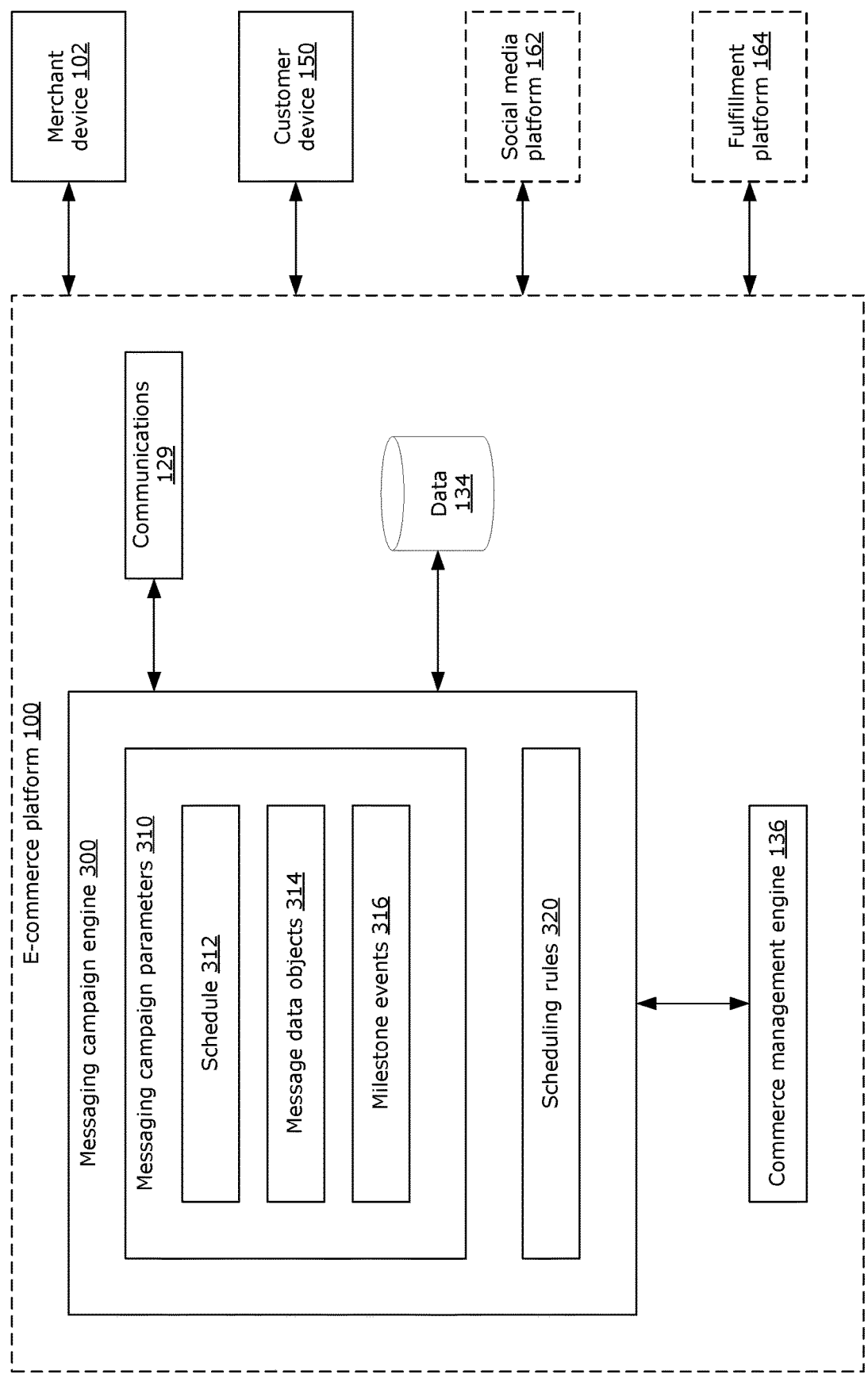
FIG. 3B is another block diagram of an example e-commerce platform, showing example details of a messaging campaign engine, in which examples described herein may be implemented.

Although the messaging campaign engine 300 is illustrated as a distinct component of the e-commerce platform 100 in FIG. 3A and FIG. 3B, this is only an example. The messaging campaign engine 300 could also or instead be provided by another component residing within or external to the e-commerce platform 100. In some embodiments, either or both of the applications 142A-B may provide an embodiment of the messaging campaign engine 300 that implements the functionality described herein. Furthermore, in some embodiments, the messaging campaign engine 300 may be implemented as part of the communications facility 129. However, the location of the messaging campaign engine 300 may be implementation specific. In some implementations, the messaging campaign engine 300 may be provided at least in part by the e-commerce platform 100, either as a core function of the e-commerce platform 100 or as an application or service supported by or communicating with the e-commerce platform 100. In some examples, the messaging campaign engine 300 may be implemented as a stand-alone service to clients such as a merchant device 102. In addition, at least some functions of the messaging campaign engine 300 may be implemented in the merchant device 102. For example, the merchant device 102 may store and run an instance of the messaging campaign engine 300 locally as a software application. For simplicity, the present disclosure describes the operation of the messaging campaign engine 300 when the messaging campaign engine 300 is implemented in the e-commerce platform, however this is not intended to be limiting.

As discussed in further detail below, the messaging campaign engine 300 may implement at least some of the functionality described herein. Although the embodiments described below may be implemented in association with an e-commerce platform, such as (but not limited to) the e-commerce platform 100 of FIG. 1, the embodiments described below are not limited to e-commerce platforms. For example, the messaging campaign engine 300 may be used to manage preorder messaging campaigns as part of a messaging platform that provides a messaging service to a merchant (who may or may not be a user of the e-commerce platform 100).

In the context of a preorder messaging campaign, a merchant on the e-commerce platform 100 may also be a marketer who plans a preorder messaging campaign on behalf of a store or a merchant. Such a marketer may, for example, use certain services provided by the e-commerce platform 100 for carrying out a preorder messaging campaign as discussed below, without having to be a customer or merchant. In some examples, the e-commerce platform 100 may make certain services/applications, such as the messaging campaign engine 300, accessible as standalone services/applications. The present disclosure makes reference to a merchant and a merchant device 102 for simplicity, however it should be understood that references to a merchant or a merchant device 102 may encompass a marketer or a marketer device.

FIG. 3B is a block diagram showing further details of the messaging campaign engine 300 in the context of the e-commerce platform 100. Some details of the e-commerce platform 100 are not shown, to avoid clutter. FIG. 3B illustrates other computing systems interacting with the e-commerce platform 100, including the merchant device 102, the customer device 150, optionally a social media platform 162 and optionally a fulfillment platform 164. As will be described further below, the messaging campaign engine 300 may communicate with the merchant device 102, the customer device 150, the social media platform 162 and/or the fulfillment platform 164 to extract data that is used for dynamically conducting a preorder messaging campaign.

Functions of the messaging campaign engine 300 may be accessible by a merchant via the commerce management engine 136. For example, the merchant (using the merchant device 102) may, via the administrator 114 or applications 142A-B (not shown in FIG. 3A), access functions of the messaging campaign engine 300 via the commerce management engine 136, to define and manage a preorder messaging campaign for a product. The messaging campaign engine 300 may communicate with the communication facility 129 or another communications interface of the e-commerce platform 100 to enable messages to be provided to one or more customers (via respective customer devices 150). The messaging campaign engine 300 may also access data 134 stored on the e-commerce platform 100, such as data about preorder sales for a product.

The messaging campaign engine 300 may store or otherwise have access to stored messaging campaign parameters 310 (e.g., stored in the data 134 managed by the e-commerce platform 100) defining a preorder messaging campaign. The messaging campaign parameters 310 defined for a single preorder messaging campaign include, in this example, at least a schedule 312, a plurality of message data objects 314, and one or more milestone events 316. There may be other parameters included in the messaging campaign parameters 310.

The schedule 312 defines the time at which each message in the preorder messaging campaign is to be provided to each customer. The schedule 312 may be based around the occurrence or timing of at least one milestone event 316. The schedule 312 may be initially defined for the preorder messaging campaign by a merchant, and may be adjusted as discussed further below.

A milestone event 316 that is defined for a preorder messaging campaign may include any merchant-configured event associated with a product. For example, a milestone event 316 may include a configured product availability date, a configured in-stock date, a configured sale start date, a configured date at which a discount is applied, or other such configurable events. A merchant may, for example, configure a target date for a milestone event 316 (e.g., a merchant may set a date of Dec. 1, 2022 for a product availability milestone event). A milestone event 316 may also include a variable date event associated with a product. For example, a milestone event 316 may include reaching a target number of preorders, reaching a target number of referrals, reaching a target manufacturing status, or other such events that may not have a fixed date. Although such variable data events may not be associated with a fixed date, the schedule 312 may include an expected date or assumed date for a variable date event (e.g., a merchant may configure an expected date for reaching a target number of preorder sales). For example, a merchant may expect that a milestone event of reaching a target number of 1000 preorders should occur at three months after the start of a preorder campaign, and thus the schedule 312 may include this milestone event 316 at three months after the first date of the preorder campaign.

The schedule 312 may also be based on the occurrence or timing of a customer event. A customer event is any event that is triggered by the actions of a customer, and that may be outside the control of the merchant. For example, the start date of the scheduler 312 may be the date that a preorder is made by a customer (i.e., the customer event is the customer making the preorder). Another customer event may be a referral made by the customer. Other such customer events may be possible.

The e-commerce platform 100 may, for example, communicate with a customer device 150 over a network (e.g., a wireless communication network) to process input and data to complete a preorder (e.g., similar to completion of a regular purchase order as discussed above) for a customer associated with the customer device 150. The messaging campaign engine 300 may obtain information about the preorder and detect this as a customer event.

Other online activity by the customer device 150 may be used to detect the customer event. For example, the messaging campaign engine 300 may communicate with or otherwise obtain data from (e.g., by querying a database or performing data scraping operations, among other possibilities) other online platforms where a customer may be active. For example, the messaging campaign engine 300 may obtain data from a social media platform 162 to detect a customer event based on social media activity by the customer. For example, the messaging campaign engine 300 may detect, from social media activity associated with the customer on the social media platform 162, that the customer has made a referral for the preorder product, and the messaging campaign engine 300 may detect this referral as a customer event.

The message data objects 314 each contains data for generating a message in the preorder messaging campaign. For example, each message data object 314 contains at least message content data (e.g., text data and/or image data) that is to be included in the body of a message. Each message data object 314 may also include unique identification data (e.g., a data object identifier (ID)), which may be crossreferenced in the schedule 312 to define the time for using each message data object 314 to generate a message, relative to each milestone event 316 in the schedule 312. The messaging campaign engine 300 may then use the schedule 312 to determine the timing to generate messages from each message data object 314.

A message data object 314 may be called by the messaging campaign engine 300, in accordance with the schedule 312, to generate a message to be provided to a customer (e.g., transmitted to a customer device 150, using the communication facility 129) as part of a preorder messaging campaign. Each message data object 314 may be called more than once, such that a single message data object 314 may be used to generate more than one message at more than one date. Further, at any given date, a single message data object 314 may be used to generate one or more messages to be provided to respective one or more customers.

For example, a first message data object 314 having a first data object ID may contain message content data for a first message (e.g., text data for a welcome message such as "Thank you for preordering"). The schedule 312 may indicate that the message data object 314 having the first data object ID should be used to generate the first message to a given customer at a date three days from the date that the preorder is made by that given customer. The messaging campaign engine 300 may thus use the first message data object 314 three days after a preorder is made by the given customer to provide the first message to the given customer. The messaging campaign engine 300 may later use the first message data object 314 three days after a preorder is later made by another customer to provide the first message to the other customer.

In another example, a second message data object 314 having a second data object ID may contain message content data for a second message (e.g., text data for a milestone-related message such as "Manufacture has started for your preorder"). The schedule 312 may indicate that the message data object 314 having the second data object ID should be used to generate the second message to all customers on the date that a milestone event 316 (e.g., the start of manufacturing) occurs. The messaging campaign engine 300 may thus use the second message data object 314 on the date of the milestone event 316 to provide the second message to multiple customers.

The messaging campaign engine 300 executes instructions to implement a number of scheduling rules 320. The scheduling rules 320 cause scheduling of messages in a preorder messaging campaign to be adjusted for each customer, responsive to event-based conditions. Further details of how the schedule 312 may be adjusted by the messaging campaign engine 300 are provided below with reference to FIG. 4.

Figure 4:
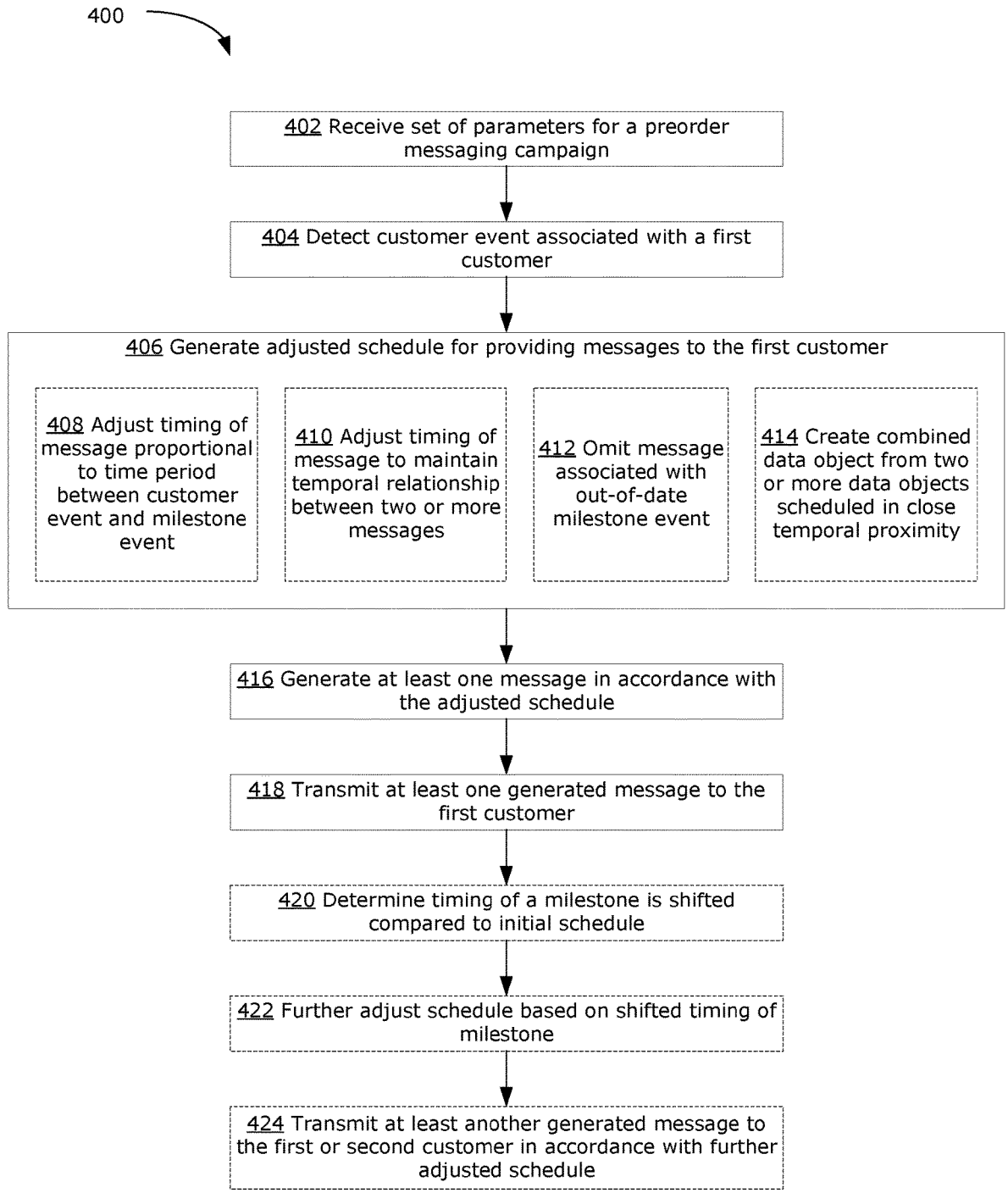
FIG. 4 is a flowchart illustrating an example method for dynamically conducting a messaging campaign, in accordance with examples of the present disclosure.

FIG. 4 is a flowchart illustrating an example method 400 that may be performed by the messaging campaign engine 300. For example, a computing system (e.g., a server, or a server cluster) implementing the e-commerce platform 100 (including the messaging campaign engine 300) may execute computer-readable instructions to perform the method 400.

At an operation 402, a set of parameters for a messaging campaign is received. For example, the set of parameters is a set of messaging campaign parameters 310 defining a preorder messaging campaign. As previously described, the set of parameters includes a set of data objects (e.g., message data objects 314) each containing respective message content. The set of parameters also includes an initial schedule (e.g., the schedule 312) for generating a set of messages from the set of data objects. The schedule 312 includes one or more milestone events defined in the set of parameters (e.g., milestone events 316).

The set of parameters may be received, for example, via network communications with a merchant device 102. For example, a merchant who is planning a preorder messaging campaign for a product may interact with the e-commerce platform 100 (e.g., via an application 142A-B or via an administrator 114) to define the parameters for the preorder messaging campaign.

At an operation 404, a customer event associated with a first customer is detected. As described previously, the customer event may be any event that is triggered by the actions of a customer. The customer event may be detected by collecting data from another computing system, via network communications. For example, data scraping of publicly-available online data (e.g., social media posts), data queries made to a social media platform 162, or interactions with a client device 150 may be used to obtain data for detecting the customer event.

At an operation 406, an adjusted schedule for providing messages to the first customer is generated. The adjusted schedule differs from the schedule initially defined in the set of parameters (e.g., the initial schedule defined by a merchant) in the timing for providing at least one message to the first customer. It should be noted that the adjusted schedule may be specific to the first customer, such that preorder messages to a second customer may be in accordance with the initial (i.e., unadjusted) schedule, or such that preorder messages to a third customer may be in accordance with yet another adjusted (i.e., differently adjusted) schedule. For clarity, the following discussion will be with respect to the adjusted schedule for providing messages to the first customer.

The adjusted schedule may be generated according to a scheduling rule 320 implemented by the messaging campaign engine 300. As depicted in FIG. 4 through the use of stippled lines, one or more optional operations may be employed, alone or in combination, in order to carry out the operation 406. For example, as shown in FIG. 4, the operation 406 may be carried out by employing one or more of the operations 408, 410, 412 and/or 414, further described below.

In an example, at an operation 408, a scheduling rule 320 may be that the timing for providing at least one message to the first customer (i.e., generating at least one message from a respective at least one message data object, and transmitting the generated at least one message to the first customer) is adjusted proportionate to (e.g., mathematically proportional to) the time period between the customer event and a first milestone event. For example, a first message (e.g., a welcome message) may be initially scheduled to be provided after a defined number of days following a customer event (e.g., three days after a preorder is made; one week after a customer has shared a referral on a social media platform; etc.) and prior to a first milestone event (e.g., prior to start of manufacturing). The initial schedule may define a time period of three months between the customer event and the first milestone event. If the occurrence of the customer event is delayed (e.g., customer makes the preorder later than expected), then the time period between the customer event and the first milestone event is shortened. Accordingly, the adjusted schedule adjusts the timing for providing the first message such that the first message is provided after a shorter number of days. For example, if the preorder is made only one month before the start of manufacturing (instead of three months as expected in the initial schedule), the welcome message may be provided only one day after the preorder is made (instead of three days as defined in the initial schedule), thus proportionate to the time period remaining between the preorder date and the start of manufacturing. It should be understood that, in the present disclosure, "proportionate to" may include "mathematically proportional to" as well as "approximately in relation to". For example, in the preceding example, if the preorder is made only one month before the start of manufacturing (instead of three months as expected in the initial schedule), this means the time period remaining between the preorder date and the start of manufacturing has been decreased by a factor of 3. The time period to provide the welcome message may be adjusted in a mathematically proportional way—i.e., also decreased by a factor of 3. Alternatively, the time period to provide the welcome message may be adjusted in an approximate way to simply shorted (not strictly decreased by a factor of 3).

In another example, at an operation 410, the adjusted schedule may be generated to adjust the timing of a first message to maintain a temporal relationship between two or more messages. In particular, the messaging campaign engine 300 may determine a temporal relationship between the first message and a second message, based on the initial schedule or the message content in the respective first and second message data objects. In some examples, a temporal relationship may be explicitly indicated in the schedule 312 (e.g., the schedule 312 may indicate that the second message is to be provided a certain number of days following the first message).

In another example, the messaging campaign engine 300 may determine temporal relationships between messages without requiring explicit indication of such temporal relationships. For example, the messaging campaign engine 300 may determine that a temporal order of messages defined in the initial schedule should be maintained (e.g., if the initial schedule places the first message earlier in time than the second message, this temporal order should be maintained). In another example, the messaging campaign engine 300 may use a natural language processing (NLP) or text parsing algorithm to identify keywords indicating a temporal order of a message. For example, a NLP or text parsing algorithm may identifying a keyword (e.g., "welcome", "new", etc.) in the message content of a first data object indicating that the message generated from the first data object should always be sent first (i.e., prior to any other message in the preorder messaging campaign).

Operations performed by the messaging campaign engine 300 to automatically determine a temporal relationship between two or more messages and to maintain the temporal relationship in the adjusted schedule, without requiring explicit input from a merchant may enable more efficient use of computing resources. For example, the amount of network communications between the messaging campaign engine and the merchant device 102 may be reduced.

In another example, at an operation 412, the adjusted schedule is generated such that a message associated with an out-of-date milestone event is omitted from the adjusted schedule. For example, after detecting the customer event at the operation 404, the messaging campaign engine 300 may determine that a second milestone event is out-of-date relative to the customer event (e.g., the customer event occurs later than the occurrence of the second milestone event). Accordingly, a message associated with the out-of-date second milestone event may be no longer relevant and the adjusted schedule should omit this message. For example, the messaging campaign engine 300 may, using the initial schedule, determine a particular data object (e.g., identify the particular data object ID indicated in the schedule) associated with the second milestone event (e.g., scheduled to be provided to customers when the second milestone event occurs). In some examples, the messaging campaign engine 300 may use a NLP or text messaging algorithm to process the message content to identify keywords that associate the data object with the second milestone event. For example, if the out-of-date second milestone event is a merchant-configured discount time period that has passed (e.g., the first customer made the preorder after the time-limited discount has expired), the messaging campaign engine 300 may identify a data object with message content having keywords related to the time-limited discount (e.g., "discount", "50%", "limited time", etc.). The messaging campaign engine 300 may adjust the schedule to omit generation of a message from the identified data object.

Operations performed by the messaging campaign engine 300 to determine a data object is associated with an out-of-date milestone event and to omit generation and transmission of the message from the data object may enable more efficient use of computing resources. For example, the processing power, memory resources and network resources (e.g., bandwidth on communication links) that would otherwise be used up by generation and transmission of an irrelevant message (as well as reception and processing of the message at the customer device 150) for an out-of-date milestone event may be saved.

It should be noted that the messaging campaign engine 300 may generate the adjusted schedule to omit other messages that are determined to be irrelevant. For example, if the message campaign engine 300 has determined (e.g., by performing data scraping of publicly available social media messages or text messages, by querying a social media platform 162, by performing a search of message history on a social media platform 162, etc.) that the first customer has already shared information about the product associated with the preorder messaging campaign, or has already generated referrals, then a data object with message content that incentivizes customer referrals (e.g., any message content including keywords related to referrals, such as "share", "refer", etc.) may be irrelevant and should be omitted from the adjusted schedule.

In another example, at an operation 414, generating the adjusted schedule may include creating a combined data object from two or more data objects that would otherwise be scheduled in close temporal proximity. The operation 414 may be performed in combination with one or more of the operations 408, 410 and/or 412 which adjusts the timing for providing messages. If the adjusted schedule would result in two messages being generated from respective two data objects and transmitted to the first customer in close temporal proximity (e.g., on the same date, or within a predefined time period, such as within three days of each other), the messaging campaign engine 300 may combine the message content of the two data objects into a new combined data object. The messaging campaign engine 300 automatically creates a new data object containing combined message content that is a combination of the message content of the two data objects. The adjusted schedule then indicates generation of a single message from the combined data object, in place of generation of two separate messages from the two separate data objects. Thus, a single message (with combined message content) is provided to the first customer instead of two separate messages.

Operations performed by the messaging campaign engine 300 to create a new combined data object, to enable a single message to be provided instead of two separate messages in close temporal proximity may help to avoid messages from the messaging campaign engine 300 being flagged as spam, and may help to avoid customer annoyance. Further, although the messaging campaign engine 300 performs operations to create a new data object, ultimately the operations may help to save computer resources by forgoing the need to repeatedly generate and transmit messages in close temporal succession.

It should be understood the messaging campaign engine 300 may adjust the schedule in other ways, responsive to the detected customer event. Thus, performing the operation 406 is not necessarily limited by any of the operations 408, 410, 412 and/or 414. Regardless of how the operation 406 is performed, the operation 416 follows.

At an operation 416, at least one message is generated in accordance with the adjusted schedule. In particular, the messaging campaign engine 300 may, using the adjusted schedule, identify a data object to use for generating at least one message of the preorder messaging campaign.

At an operation 418, the generated message is transmitted to the first customer. For example, the messaging campaign engine 300 may provide the generated message to the communications facility 129 of the e-commerce platform 100, to transmit (e.g., over wireless communication links) the message to the customer device 150 associated with the first customer.

Optionally, at an operation 420, at any time during the preorder messaging campaign, the messaging campaign engine 300 may determine that the timing of a particular milestone has shifted compared to the expected date indicated in the initial schedule. In particular, the messaging campaign engine 300 may determine that the timing of a particular milestone has shifted after at least one message has already been provided (e.g., generated and transmitted) to the first customer.

The determination that the timing of a milestone event has shifted may be based on input received from a merchant device 102 (e.g., a merchant may manually provide input indicating that a milestone event is shifted in timing). For example, a shift in the timing of a merchant-configured milestone event (e.g., a merchant-set date for an event such as a discount event) may be explicitly inputted by a merchant.

In some examples, determination that the timing of a milestone event has shifted may be based on computer network communications, without requiring explicit human input. For example, the messaging campaign engine 300 may determine that a milestone event is reaching a target threshold (e.g., a target number of preorders, a target number of referrals, a target manufacturing status, etc.). A target threshold which may be explicitly indicated in the corresponding definition of the milestone event 316 included in the messaging campaign parameters 310, or may be determined by the messaging campaign engine 300 (e.g., based on NLP or text parsing analysis of the message content of a data object for generating a message related to the milestone event). The messaging campaign engine 300 may communicate with a relevant system to determine whether the expected timing for reaching the target threshold has shifted.

For example, if a milestone event is defined as reaching a threshold number of preorder customers (e.g., reaching 1000 preorders), the messaging campaign engine 300 may query a database tracking the number of customers (e.g., the data 134 of the e-commerce platform 100), to extract a historical trend of customer preorders. Based on the historical trend, the messaging campaign engine 300 may extrapolate or otherwise predict the shifted timing of reaching the threshold number of preorder customers. For example, if customers are making preorders faster than expected in the initial schedule, the associated milestone event may be shifted earlier in time; if customers are making preorders slower than expected in the initial schedule, the associated milestone event may be shifted later in time.

In another example, if a milestone event is defined as reaching a threshold number of referrals or social media shares (e.g., reaching 5000 social media posts), the messaging campaign engine 300 may perform data scraping of publicly available social media posts on a social media platform 162 or query the social media platform 162, to extract a historical trend (e.g., using extrapolation or other prediction techniques) of social media referrals or shares. Based on the historical trend, the messaging campaign engine 300 may extrapolate or otherwise predict the shifted timing of reaching the threshold number of referrals or social media shares. For example, if social media posts about the product associated with the preorder are being shared at a greater rate than expected in the initial schedule, the associated milestone event may be shifted earlier in time; if social media posts about the preorder are being shared at a lower rate than expected in the initial schedule, the associated milestone event may be shifted later in time.

In another example, if a milestone event is defined as reaching a manufacturing threshold or target manufacturing status (e.g., enough parts have arrived to start manufacturing, or 1000 products for preorders have been manufactured), the messaging campaign engine 300 may query or otherwise extract data from (e.g., using data scraping or other data mining techniques) a fulfillment platform 164 or other database tracking a manufacturing status of a product associated with a preorder (e.g., number of parts received, number of products manufactured, etc.). From this data, the messaging campaign engine 300 may extract a historical trend (e.g., using extrapolation or other prediction techniques) of the manufacturing status. Based on the historical trend, the shifted messaging campaign engine 300 may determine that timing of the milestone event has shifted. For example, if parts required to manufacture the product are arriving faster than expected in the initial schedule, the associated milestone event may be shifted earlier in time; if parts required to manufacture the product are arriving slower than expected in the initial schedule, the associated milestone event may be shifted later in time.

In some examples, a milestone event may shift in timing responsive to at least one message having been transmitted to the first customer. For example, the first customer may take an action based on the received message (e.g., a message might cause a customer to send a referral for the product to their social network, or might cause a customer to pay for priority shipment to ensure they receive the product in the first shipment, etc.), which affects the timing of the milestone event (e.g., if the milestone event is reaching a threshold number of referrals, then this milestone event is shifted due to actions, such as the customer sharing referral information, resulting from the earlier transmitted message). Thus, the shift in timing of the milestone event (and the further adjusting of the schedule at operation 422 below) may be dependent on and responsive to an earlier message transmitted within the same messaging campaign. In other words, the method 400 may enable the messaging campaign to be conducted in a dynamic, self-adjusting way, where each and every message that is transmitted can impact the scheduling of other messages in the messaging campaign. Further, transmission of a message to a first customer may result in adjusting the scheduling of another message to a different second customer. For example, if a milestone event is reaching a threshold number of customers paying for priority shipment, then a first message to the first customer may result in that threshold number being reached earlier than expected (e.g., the first customer may, in response to receiving the first message, modify their preorder to pay for priority shipment, thus increasing the number of customers paying for priority shipment). In response to the shifted timing of this milestone event, the scheduling of another message (which promotes the priority shipment option) to the second customer may be dynamically adjusted (e.g., the message to the second customer may be omitted entirely, because the maximum number of priority shipments that can be satisfied by the first run of the product has been reached).

Optionally, at an operation 422, in response to a determination that the timing of a milestone event has shifted compared to the initial schedule, the schedule (which may have already been adjusted at the operation 406) may be further adjusted based on the shifted timing of the milestone event. The further adjustment of the schedule may be performed using any of the adjustment techniques previously described with reference to the operation 406 (e.g., including operations 408, 410, 412 and/or 414, alone or in any combination). The further adjustment of the schedule may adjust the timing for providing messages prior to, at the occurrence of, or following the milestone event.

For example, if the shifted timing of a milestone event is earlier than the expected timing of the milestone event in the initial schedule, the messaging campaign engine 300 may proportionately move up the timing of messages that are scheduled to be provided prior to the milestone event. The messaging campaign engine 300 may also proportionately adjust the timing of messages that are scheduled to be provided following the milestone event.

For example, if the start of manufacturing is initially expected to occur two months into the preorder messaging campaign and has shifted to occur only one month into the preorder messaging campaign, the adjusted schedule may halve the timing for providing messages that were initially scheduled to be provided prior to the start of manufacturing, and may proportionately stretch out the timing for providing messages initially scheduled to be provided between the start of manufacturing and a fixed product release date. Similar adjustments to the schedule may be made if the shifted timing of a milestone event is later than the expected timing in the initial schedule.

Following the operation 422, optional operation 424 may be performed, to transmit at least another generated message to the first or a second customer in accordance with the further adjusted schedule (e.g., using operations similar to the operations 416 and 418 described above). Instead of the operation 424, the method 400 may instead loop back to the operation 416, to generate and transmit messages in accordance with the further adjusted schedule. In some examples, the operations 420-424 may be considered another iteration of the method 400, starting at operation 404. In other words, the method 400 may be continually iterating to enable continual self-adjusting of the dynamically conducted messaging campaign.

Using the method 400, the schedule for providing messages in the preorder messaging campaign may be adjusted for a specific customer, responsive to a customer event associated with that specific customer (e.g., a preorder made by that specific customer). Thus, the preorder messaging campaign may be tailored to enable more efficient use of computing resources for communicating with that specific customer.

Using the method 400, the schedule for providing messages may be adjusted at any time during the preorder messaging campaign, and may be adjusted after one or more messages have already been provided to a given customer. For example, some messages may be provided to a given customer following the initial schedule; however, after determining that the timing of a milestone event has shifted (e.g., start of manufacturing is delayed), remaining messages in the preorder messaging campaign may be provided to that given customer following an adjusted schedule.

Further, the method 400 may be performed repeatedly for the duration of the preorder messaging campaign, enabling the schedule to be repeatedly adjusted dynamically, in response to detection of real-time customer events. That is, a schedule that has been adjusted (e.g., using the operation 406) in response to one detected customer event may, at a later time, be adjusted again (e.g., again using the operation 406) in response to another detected customer event.

Figure 5A:
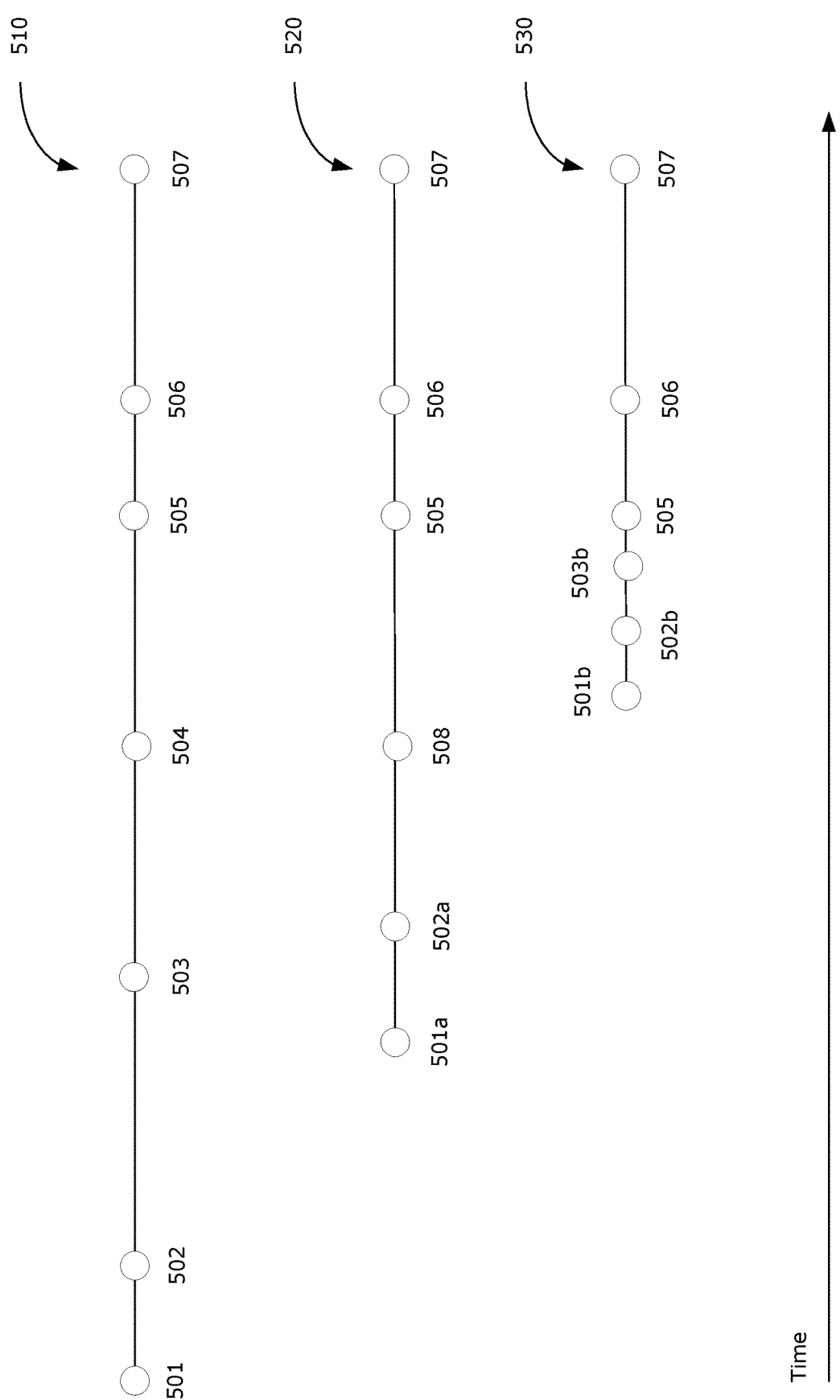
FIGS. 5A and 5B illustrate some simple examples of how a messaging campaign may be dynamically conducted, in accordance with examples of the present disclosure.
Figure 5B:
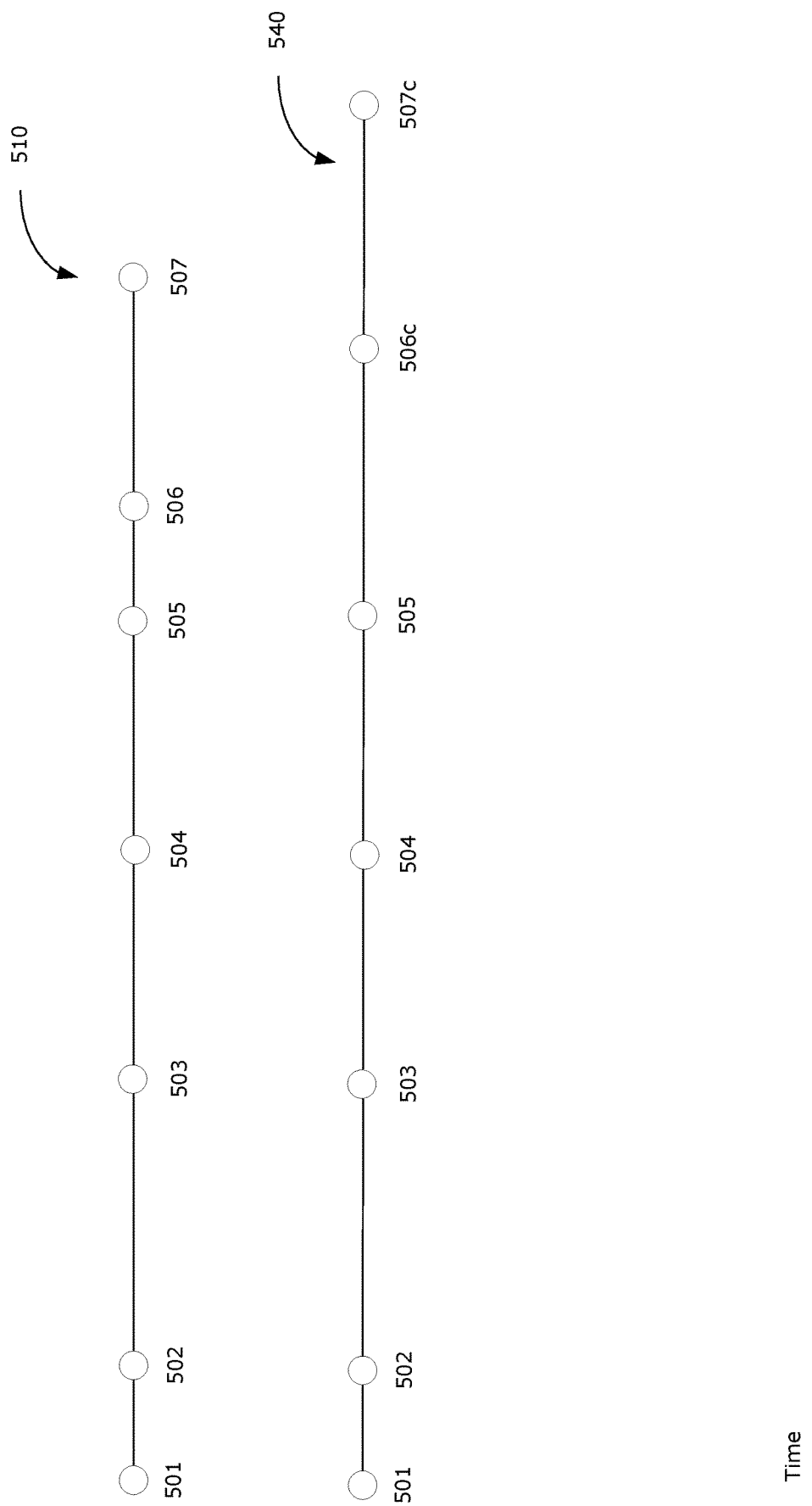

FIGS. 5A-5B illustrate examples of how an initial schedule defined for a preorder messaging campaign may be adjusted by the messaging campaign engine 300

FIG. 5A illustrates an initial schedule 510 (e.g., initially set by a merchant managing the preorder messaging campaign) for providing a set of messages 501-507 to a customer. A simple example of the initial schedule 510 may be: a preorder confirmation message 501 provided on the date the preorder is made; a welcome message 502 provided three days after the date of the preorder; a referral incentive message 503 provided one month after the date of the preorder; a 600 preorders sold message 504 provided when a first milestone event (i.e., reaching a target number of preorders sold) is reached; a manufacturing start message 505 provided at a fixed date second milestone event (i.e., the start of manufacturing); a manufacturing in progress message 506 provided one week after the start of manufacturing milestone event; and a product shipped message 507 provided when a third milestone event (i.e., product is shipped) is reached.

FIG. 5A illustrates an adjusted schedule 520, in which a combined message 508 is generated from a combined data object and is provided instead of the two separate messages 503 and 504. In the adjusted schedule 520, the customer makes a preorder at a later date than expected in the initial schedule 510. The preorder confirmation message 501a is provided on the date the preorder is made (later than in the initial schedule 510). The messaging campaign engine 300 adjusts the timing of the welcome message 502 and the referral incentive message 503 proportionate to the time period remaining between the preorder date and the fixed start of manufacturing date. This results in the welcome message 502a being provided only two days (instead of three days in the initial schedule 510) after the date of the preorder. Further, the adjusted timing would result in the referral incentive message being provided only two days before the manufacturing start message, so the messaging campaign engine 300 creates a new combined data object that combines (e.g., concatenates) the message contents of the referral incentive message and the manufacturing start message. Instead of the referral incentive message and the manufacturing start message being provided as separate messages (as in the initial schedule 510), in the adjusted schedule 520 a single combined message 508 is generated from the combined data object. Messages 505, 506, 507 may then follow the initial schedule 510 since the milestone events associated with the messages 505, 506, 507 occur at the expected timing.

FIG. 5A illustrates another adjusted schedule 530, in which the manufacturing start message 504 is omitted. In the adjusted schedule 530, the customer makes a preorder at a date that is later than the date at which the target number of preorders sold is reached. Accordingly, the messaging campaign engine 300 determines that the milestone event of reaching a target number of preorders is an out-of-date milestone event and the 600 preorders sold message 504 is omitted from the adjusted schedule 530. The preorder confirmation message 501b is provided on the date the preorder is made (later than in the initial schedule 510), and the welcome message 502b and referral incentive message 503b are provided at adjusted timing that is proportionate to the amount of time remaining between the preorder date and the fixed start of manufacturing date. Messages 505, 506, 507 may then follow the initial schedule 510 since the milestone events associated with the messages 505, 506, 507 occur at the expected timing.

FIG. 5B illustrates the initial schedule 510 again for reference. FIG. 5B illustrates another adjusted schedule 540 in which the product shipped milestone event has a shifted timing (in this example, a delayed timing). Messages 501-505 may follow the initial schedule 510 since the customer event and milestone events associated with the messages 501-505 occur at the expected timing. The messaging campaign engine 300 determines (e.g., through communications with a fulfillment platform 164 or by extracting data from another database tracking manufacturing status) that the product shipped milestone event has a shifted timing. In this example, the messaging campaign engine 300 extracts a historical trend indicating that manufacturing is progressing at a slower rate than expected in the initial schedule 510 and thus the product shipped milestone event has a delayed timing. The messaging campaign engine 300 then adjusts the timing of the manufacturing in progress message 506c proportionate to the increase in the time period between the start of manufacturing milestone event and the product shipped milestone event, so that the manufacturing in progress message 506c is provided three weeks (instead of one week in the initial schedule 510) after the start of manufacturing milestone event. The product shipped message 507c is provided when the product shipped milestone event is reached.

In various examples, the present disclosure has described systems and methods enabling dynamic conducting of a messaging campaign. The dynamic conducting is more adaptive to deviations from an expected timeline of customer events and milestone events, and enables more intelligent use of resources, compared to conventional messaging techniques.

The dynamic conducting of the messaging campaign may enable dynamically generating an adjusted schedule for a messaging campaign that omits irrelevant messages (e.g., omitting messages associated with an out-of-date milestone event), that maintains a temporal relationship between messages (e.g., so that the temporal order of messages is maintained), that adjusts timing for providing messages proportionate to an increased or decreased time period between events, or that adjusts timing dynamically partway through a messaging campaign (e.g., after one or more messages have already been provided) in response to shifted timing of a milestone event.

The dynamic conducting of a messaging campaign may also enable dynamically generating an adjusted schedule for a messaging campaign in which two messages that would otherwise be provided in close temporal proximity (e.g., within two days of each other) are instead replaced by a single message containing message content combined from the two messages. This may enable more adaptive messaging, compared to conventional messaging campaigns in which the content of messages are fixed after being set (e.g., by a merchant).

Although the present disclosure describes methods and processes with operations (e.g., steps) in a certain order, one or more operations of the methods and processes may be omitted or altered as appropriate. One or more operations may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A system comprising a processing unit configured to execute instructions to cause the system to:
   receive a set of parameters for a messaging campaign, the set of parameters including a set of data objects each containing respective message content, the set of parameters also including an initial schedule for providing a set of messages from the set of data objects, wherein the initial schedule includes one or more milestone events defined in the set of parameters;
   responsive to a customer event associated with a first customer, generate an adjusted schedule for providing the set of messages to the first customer by:
      identifying a first milestone event that is out-of-date relative to the customer event;

determining a particular data object associated with the first milestone event using a natural language processing (NLP) or text parsing algorithm to process a message content of the particular data object to identify a keyword related to the first milestone event; and generating the adjusted schedule to omit generation of any message from the particular data object;

wherein the adjusted schedule differs from the initial schedule in a timing for providing a first message, wherein in the adjusted schedule the first message is scheduled to be provided at an adjusted timing proportionate to a time period between the customer event and a second milestone event;

identify a second message that is scheduled in close temporal proximity to the adjusted timing of the first message in the adjusted schedule;

generate a new combined data object containing combined message content corresponding to a combination of the first and second messages, the combined data object being generated by extracting data from a first data object used to generate the first message and from a second data object used to generate the second message;

update the adjusted schedule to replace the first and second messages with a single combined message;

generate the single combined message from the combined data object, in accordance with the adjusted schedule; and responsive to generation of the single combined message, transmit the single combined message to the first customer.

2. The system of claim 1, wherein the processing unit is further configured to execute instructions to cause the system to generate the adjusted schedule by:

determining a temporal relationship between the first message and a third message, based on the initial schedule or the message content in respective first and third data objects from which the first and the third messages are generated;

wherein the temporal relationship is maintained between the single combined message and the third message in the adjusted schedule.

3. The system of claim 1, wherein the processing unit is further configured to execute instructions to cause the system to:

responsive to determining that a timing of a third milestone event is shifted compared to the initial schedule, determine at least a fourth message scheduled by the initial schedule to be provided prior to occurrence of the third milestone; and further adjust the adjusted schedule to adjust timing for providing the fourth message proportionate to the shifted timing of the third milestone.

4. The system of claim 3, wherein the processing unit is further configured to execute instructions to cause the system to:

prior to determining the shifted timing of the third milestone, generate and transmit at least the single combined message in accordance with the adjusted schedule, wherein one or more remaining messages, including the fourth message, are scheduled to be provided prior to occurrence of the third milestone in accordance with the adjusted schedule; and subsequent to determining the shifted timing of the third milestone, generate and transmit the one or more remaining messages, including the fourth message, in accordance with the further adjusted schedule.

5. The system of claim 3, wherein the third milestone event is defined as reaching a threshold number of customers, wherein the processing unit is further configured to execute instructions to cause the system to:

query a database tracking the number of customers, to extract a historical trend; and determine, based on the historical trend, the shifted timing of the third milestone event.

6. The system of claim 3, wherein the third milestone event is defined as reaching a manufacturing threshold, wherein the processing unit is further configured to execute instructions to cause the system to:

query a database tracking a manufacturing status, to extract a historical trend; and determine, based on the historical trend, the shifted timing of the third milestone event.

7. The system of claim 2, wherein the temporal relationship is determined using the NLP or text parsing algorithm to identify another keyword in the first message or the third message indicating the temporal relationship.

8. A method, comprising:

receiving a set of parameters for a messaging campaign, the set of parameters including a set of data objects each containing respective message content, the set of parameters also including an initial schedule for providing a set of messages from the set of data objects, wherein the initial schedule includes one or more milestone events defined in the set of parameters;

responsive to a customer event associated with a first customer, generating an adjusted schedule for providing the set of messages to the first customer by:

identifying a first milestone event that is out-of-date relative to the customer event;

determining a particular data object associated with the first milestone event using a natural language processing (NLP) or text parsing algorithm to process a message content of the particular data object to identify a keyword related to the first milestone event; and generating the adjusted schedule to omit generation of any message from the particular data object;

wherein the adjusted schedule differs from the initial schedule in a timing for providing a first message, wherein in the adjusted schedule the first message is scheduled to be provided at an adjusted timing proportionate to a time period between the customer event and a second milestone event;

identifying a second message that is scheduled in close temporal proximity to the adjusted timing of the first message in the adjusted schedule;

generating a new combined data object containing combined message content corresponding to a combination of the first and second messages, the combined data object being generated by extracting data from a first data object used to generate the first message and from a second data object used to generate the second message;

updating the adjusted schedule to replace the first and second messages with a single combined message;

generating the single combined message from the combined data object, in accordance with the adjusted schedule; and responsive to generation of the single combined message, transmitting the single combined message to the first customer.

9. The method of claim 8, wherein generating the adjusted schedule comprises:
determining a temporal relationship between the first message and a third message, based on the initial schedule or the message content in respective first and third data objects from which the first and the third messages are generated;
wherein the temporal relationship is maintained between the single combined message and the third message in the adjusted schedule.

10. The method of claim 8, further comprising:
responsive to determining that a timing of a third milestone event is shifted compared to the initial schedule, determining at least a fourth message scheduled by the initial schedule to be provided prior to occurrence of the third milestone; and
further adjusting the adjusted schedule to adjust timing for providing the fourth message proportionate to the shifted timing of the third milestone.

11. The method of claim 10, further comprising:
prior to determining the shifted timing of the third milestone, generating and transmitting at least the single combined message in accordance with the adjusted schedule, wherein one or more remaining messages, including the fourth message, are scheduled to be provided prior to occurrence of the third milestone in accordance with the adjusted schedule; and
subsequent to determining the shifted timing of the third milestone, generating and transmitting the one or more remaining messages, including the fourth message, in accordance with the further adjusted schedule.

12. The method of claim 10, wherein the third milestone event is defined as reaching a threshold number of customers, the method further comprising:
querying a database tracking the number of customers, to extract a historical trend; and
determining, based on the historical trend, the shifted timing of the third milestone event.

13. The method of claim 10, wherein the third milestone event is defined as reaching a manufacturing threshold, the method further comprising:
querying a database tracking a manufacturing status, to extract a historical trend; and
determining, based on the historical trend, the shifted timing of the third milestone event.

14. A non-transitory computer readable medium having instructions encoded thereon, wherein the instructions, when executed by a computing system, cause the computing system to:
receive a set of parameters for a messaging campaign, the set of parameters including a set of data objects each containing respective message content, the set of parameters also including an initial schedule for providing a set of messages from the set of data objects, wherein the initial schedule includes one or more milestone events defined in the set of parameters;
responsive to a customer event associated with a first customer, generate an adjusted schedule for providing the set of messages to the first customer by:
identifying a first milestone event that is out-of-date relative to the customer event;
determining a particular data object associated with the first milestone event using a natural language processing (NLP) or text parsing algorithm to process a message content of the particular data object to identify a keyword related to the first milestone event; and
generating the adjusted schedule to omit generation of any message from the particular data object;
wherein the adjusted schedule differs from the initial schedule in a timing for providing a first message, wherein in the adjusted schedule the first message is scheduled to be provided at an adjusted timing proportionate to a time period between the customer event and a second milestone event;
identify a second message that is scheduled in close temporal proximity to the adjusted timing of the first message in the adjusted schedule;
generate a new combined data object containing combined message content corresponding to a combination of the first and second messages, the combined data object being generated by extracting data from a first data object used to generate the first message and from a second data object used to generate the second message;
update the adjusted schedule to replace the first and second messages with a single combined message;
generate the single combined message from the combined data object, in accordance with the adjusted schedule; and
responsive to generation of the single combined message, transmit the single combined message to the first customer.

15. The non-transitory computer readable medium of claim 14, wherein the instructions further cause the system to:
generate and transmit at least the single combined message in accordance with the adjusted schedule, wherein one or more remaining messages, including a third message, are scheduled to be provided prior to occurrence of a third milestone in accordance with the adjusted schedule;
responsive to determining that a timing of the third milestone event is shifted compared to the initial schedule;
further adjust the adjusted schedule to adjust timing for providing the third message proportionate to the shifted timing of the third milestone; and
generate and transmit the one or more remaining messages, including the third message, in accordance with the further adjusted schedule.

16. The non-transitory computer readable medium of claim 14, wherein the instructions further cause the system to:
determine a temporal relationship between the first message and a fourth message, based on the initial schedule or the message content in respective first and fourth data objects from which the first and the fourth messages are generated;
wherein the temporal relationship is maintained between the single combined message and the fourth message in the adjusted schedule.

* * * * *